United States Patent
Yu et al.

(10) Patent No.: US 8,929,805 B2
(45) Date of Patent: Jan. 6, 2015

(54) SYSTEM, METHOD, AND DEVICE FOR RADIO FREQUENCY COMMUNICATION

(75) Inventors: Yunbo Yu, Shenzhen (CN); Shan Zhu, Shenzhen (CN); Xikui Li, Shenzhen (CN); Zhiqin Hao, Shenzhen (CN); Yan Lu, Shenzhen (CN); Jianhua Liang, Shenzhen (CN)

(73) Assignee: Nationz Technologies Inc., Shenzhen (CN)

( * ) Notice: Subject to any disclaimer, the term of this patent is extended or adjusted under 35 U.S.C. 154(b) by 1085 days.

(21) Appl. No.: 12/949,453

(22) Filed: Nov. 18, 2010

(65) Prior Publication Data

US 2011/0151900 A1 Jun. 23, 2011

Related U.S. Application Data

(63) Continuation-in-part of application No. PCT/CN2008/001735, filed on Oct. 15, 2008, and a (Continued)

(30) Foreign Application Priority Data

| Oct. 30, 2007 | (CN) | 2007 1 0124354 |
| May 19, 2008 | (CN) | 2008 1 0067445 |
| May 19, 2008 | (CN) | 2008 1 0067447 |
| May 20, 2008 | (CN) | 2008 1 0067439 |
| May 20, 2008 | (CN) | 2008 1 0067441 |
| May 20, 2008 | (CN) | 2008 1 0067443 |
| May 20, 2008 | (CN) | 2008 1 0067444 |
| Jul. 29, 2008 | (CN) | 2008 1 0142623 |
| Jul. 29, 2008 | (CN) | 2008 1 0142624 |

(51) Int. Cl.
*H04B 5/00* (2006.01)
*G06K 19/077* (2006.01)

(52) U.S. Cl.
CPC ........ *G06K 19/077* (2013.01); *G06K 19/07749* (2013.01); *G06K 19/07769* (2013.01); *G06K 19/07786* (2013.01)
USPC ........... 455/41.1; 455/41.2; 455/522; 455/68; 455/69; 455/556.1; 340/10.4; 340/10.41; 340/13.24; 340/13.25; 340/13.26

(58) Field of Classification Search
USPC ........ 455/41.1, 41.2, 522, 68, 69, 550.1, 551, 455/556.1, 557, 558, 456.1, 456.3, 456.6; 340/572.1, 572.4, 572.5, 10.3, 10.4, 340/10.41, 10.42, 13.24, 13.25, 13.26
See application file for complete search history.

(56) References Cited

U.S. PATENT DOCUMENTS 5,995,006 A 11/1999 Walsh
6,459,409 B1 10/2002 Kohno et al.
(Continued)

FOREIGN PATENT DOCUMENTS

CN 1360804 A 7/2002
CN 2603454 Y 2/2004
(Continued)

OTHER PUBLICATIONS

Notice of Reasons for Rejection in JP Appln No. 2010-530247 dated May 7, 2013.

(Continued)

*Primary Examiner* — Tuan A Tran
(74) *Attorney, Agent, or Firm* — Foley & Lardner LLP

(57) ABSTRACT

A radio frequency communication system, method, and device operate in the VHF, UHF, or SHF range, where a controller controls the radio-frequency communication range provided by the VHF, UHF, or SHF radiation.

21 Claims, 16 Drawing Sheets

Related U.S. Application Data continuation-in-part of application No. PCT/CN2008/001736, filed on Oct. 15, 2008, and a continuation-in-part of application No. PCT/CN2008/001748, filed on Oct. 17, 2008, and a continuation-in-part of application No. PCT/CN2008/001774, filed on Oct. 21, 2008, and a continuation-in-part of application No. PCT/CN2008/001837, filed on Nov. 3, 2008, and a continuation-in-part of application No. PCT/CN2008/001913, filed on Nov. 24, 2008, and a continuation-in-part of application No. PCT/CN2008/001980, filed on Dec. 5, 2008, and a continuation-in-part of application No. PCT/CN2008/001979, filed on Dec. 5, 2008, and a continuation-in-part of application No. 12/837,849, filed on Jul. 16, 2010, now Pat. No. 8,061,625, which is a continuation of application No. 12/771,675, filed on Apr. 30, 2010, now Pat. No. 8,002,196, which is a continuation of application No. PCT/CN2008/001452, filed on Aug. 12, 2008.

(56) References Cited

U.S. PATENT DOCUMENTS

| | | | |
|---|---|---|---|
| 6,557,753 | B1 | 5/2003 | Beaujard et al. |
| 6,585,166 | B1 | 7/2003 | Ookawa et al. |
| 6,685,096 | B1 * | 2/2004 | Degrauwe et al. ............ 235/492 |
| 6,717,801 | B1 | 4/2004 | Castell et al. |
| 6,870,733 | B2 | 3/2005 | Castell et al. |
| 6,883,718 | B1 | 4/2005 | Le et al. |
| 6,973,327 | B2 | 12/2005 | Seita |
| 7,015,794 | B2 * | 3/2006 | Degrauwe et al. ............ 340/10.4 |
| 7,221,159 | B2 | 5/2007 | Griffiths et al. |
| 7,228,155 | B2 | 6/2007 | Saunders |
| 7,278,022 | B2 * | 10/2007 | Suzuki ........................ 713/182 |
| 7,296,754 | B2 | 11/2007 | Nishizawa et al. |
| 7,337,978 | B2 | 3/2008 | Lee |
| 7,341,182 | B2 * | 3/2008 | Lai et al. ...................... 235/380 |
| 7,345,638 | B1 | 3/2008 | Tan et al. |
| 7,395,975 | B2 | 7/2008 | Ito |
| 7,418,272 | B2 | 8/2008 | Son |
| 7,460,076 | B2 | 12/2008 | Hayes et al. |
| 7,503,505 | B2 | 3/2009 | Koyama et al. |
| 7,602,293 | B2 * | 10/2009 | Taki et al. .................. 340/572.1 |
| 7,679,514 | B2 | 3/2010 | Rofougaran et al. |
| 7,686,654 | B2 | 3/2010 | Hubert et al. |
| 8,027,165 | B2 * | 9/2011 | Wallace et al. ............... 361/737 |
| 8,159,331 | B2 * | 4/2012 | Stagg ........................ 340/10.3 |
| 8,233,842 | B2 * | 7/2012 | Symons ...................... 455/41.1 |
| 8,242,907 | B2 * | 8/2012 | Butler et al. .............. 340/572.1 |
| 2004/0012481 | A1 | 1/2004 | Brusseaux |
| 2004/0152470 | A1 | 8/2004 | Spain |
| 2005/0212690 | A1 | 9/2005 | Nishikawa et al. |
| 2005/0248926 | A1 | 11/2005 | Asom et al. |
| 2005/0258940 | A1 | 11/2005 | Quan |
| 2005/0280511 | A1 | 12/2005 | Yokoyama et al. |
| 2006/0091200 | A1 | 5/2006 | Lai et al. |
| 2006/0224901 | A1 | 10/2006 | Lowe |
| 2007/0012785 | A1 | 1/2007 | Ohyama |
| 2007/0022012 | A1 | 1/2007 | Wu et al. |
| 2007/0049338 | A1 | 3/2007 | He et al. |
| 2007/0213096 | A1 | 9/2007 | Bella et al. |
| 2007/0243901 | A1 | 10/2007 | Cho |
| 2007/0254626 | A1 | 11/2007 | Ahlgren |
| 2008/0076474 | A1 | 3/2008 | Ho |
| 2008/0320187 | A1 | 12/2008 | Kim et al. |
| 2009/0063340 | A1 | 3/2009 | Chiang |
| 2009/0102741 | A1 | 4/2009 | Li et al. |

FOREIGN PATENT DOCUMENTS

| | | |
|---|---|---|
| CN | 1578530 A | 2/2005 |
| CN | 1642342 A | 7/2005 |
| CN | 1687965 A | 10/2005 |
| CN | 1688895 A | 10/2005 |
| CN | 2733623 Y | 10/2005 |
| CN | 1714267 A | 12/2005 |
| CN | 1714367 A | 12/2005 |
| CN | 1722521 A | 1/2006 |
| CN | 1747229 A | 3/2006 |
| CN | 2762469 Y | 3/2006 |
| CN | 1773528 A | 5/2006 |
| CN | 1787663 A | 6/2006 |
| CN | 1845179 A | 10/2006 |
| CN | 1855131 A | 11/2006 |
| CN | 1928924 A | 3/2007 |
| CN | 1969499 A | 5/2007 |
| CN | 2912132 Y | 6/2007 |
| CN | 101009898 A | 8/2007 |
| CN | 200959362 Y | 10/2007 |
| CN | 101087453 A | 12/2007 |
| CN | 200990090 Y | 12/2007 |
| CN | 101114901 A | 1/2008 |
| CN | 101140614 A | 3/2008 |
| CN | 101150816 A | 3/2008 |
| CN | 101159029 A | 4/2008 |
| CN | 101159912 A | 4/2008 |
| CN | 101164356 A | 4/2008 |
| CN | 101228532 A | 7/2008 |
| CN | 101309142 A | 11/2008 |
| CN | 101330303 A | 12/2008 |
| CN | 101330684 A | 12/2008 |
| DE | 102004057763 A1 | 6/2006 |
| EP | 1720350 A1 | 11/2006 |
| JP | 2002-236901 | 8/2002 |
| JP | 2002-279374 | 9/2002 |
| JP | 2003-016409 | 1/2003 |
| JP | 2004-086402 | 3/2004 |
| JP | 2004-272889 | 9/2004 |
| JP | 2005-109603 | 4/2005 |
| JP | 2005331434 | 12/2005 |
| JP | 2006-270681 | 10/2006 |
| JP | 2006-352697 | 12/2006 |
| JP | 2007-006123 | 1/2007 |
| JP | 2007-249599 | 9/2007 |
| JP | 2009-069872 | 4/2009 |
| KR | 20060025212 A | 3/2006 |
| KR | 20060121556 A | 11/2006 |
| TW | 10-2007-0047264 | 5/2007 |
| WO | WO-2004/075082 A2 | 9/2004 |
| WO | WO 2005/051027 A2 | 6/2005 |
| WO | WO 2005/104584 A1 | 11/2005 |
| WO | WO 2006/010460 A1 | 2/2006 |
| WO | WO 2006/017424 A2 | 2/2006 |

OTHER PUBLICATIONS

Notice of Reasons for Rejection in JP Appln No. 2010-530247 dated Nov. 20, 2012.
Supplementary European Search Report EP 08 80 0492 dated Oct. 27, 2010.
International Search Report PCT/CN2008/001748 dated May 7, 2009.
International Search Report PCT/CN2008/001452 dated Nov. 27, 2008.
International Search Report PCT/CN2008/001913 dated Mar. 5, 2009.
International Search Report PCT/CN2008/001736 dated Feb. 26, 2009.
International Search Report PCT/CN2008/001774 dated Feb. 19, 2009.
International Search Report PCT/CN2008/001980 dated Mar. 12, 2009.
International Search Report of PCT/CN2008/001979 dated Feb. 26, 2009.
International Search Report PCT/CN2008/001837 dated May 14, 2009.

(56) References Cited

OTHER PUBLICATIONS

International Search Report PCT/CN2008/001735 dated Mar. 5, 2009.
International Search Report for PCT/CN2008/001452, issued Nov. 27, 2008. (2 pages).
Rakers et al., "Secure Contactless Smartcard ASIC with DPA Protection", IEEE 2000 Custom Integrated Circuits Conference, 2000, pp. 239-242. Retrieved from the internet at: http://www.it.iitb.ac.in/~satish/phd/smartcard/ieee/00852657%20secure%20contactless%20smartcard%20ASIC%20with%20DPA%20protection.pdf.
Final Office Action U.S. Appl. No. 12/771,675 dated Nov. 12, 2010.
Non-Final Office Action U.S. Appl. No. 12/771,675 dated Sep. 1, 2010.
Notice of Allowance U.S. Appl. No. 12/771,675 dated Apr. 14, 2011.
Non-Final Office Action U.S. Appl. No. 12/837,849 dated Nov. 12, 2010.
Final Office Action U.S. Appl. No. 12/837,849 dated May 24, 2011.
Notice of Allowance U.S. Appl. No. 12/837,849 dated Aug. 22, 2011.
"Contactless Payment and the Retail Point of Sale: Applications, Technologies and Transaction Models", A Smart Card Alliance Report, Mar. 2003, pp. 1-50, Retrieved from the internet on Mar. 24, 2010 at: http://www.it.iitb.ac.in/-tij o/ seminar/Contactless_Pmt_Report.pdf.
Office Action in Malaysian Patent Application No. PI 2010001955; mailing date Dec. 13, 2013; 11 pages.
Search Report and Written Opinion issued in SG No. 201002952-8; issued Aug. 2, 2011; 18 pages.

* cited by examiner

| Distance | Beacon detector number of amplifications: 1 Can it communicate | 10 CM scale detector, number of amplifications: 0.5 Can it communicate | 5 CM scale detector, number of amplifications: 0.4 Can it communicate | 2 CM scale detector, number of amplifications: 0.3 Can it communicate | Minimum scale detector, number of amplifications: 0.2 Can it communicate |
|---|---|---|---|---|---|
| 0 CM | Y | Y | Y | Y | Y |
| 2 CM | Y | Y | Y | Y | N |
| 5 CM | Y | Y | Y | N | N |
| 10 CM | Y | Y | N | N | N |
| 15 CM | Y | N | N | N | N |
| 20 CM | N | N | N | N | N |
| 30 CM | N | N | N | N | N |
| 50 CM | N | N | N | N | N |

Note: In this table, letter "Y" indicates "yes" and letter "N" indicates "no."

Fig. 20

SYSTEM, METHOD, AND DEVICE FOR RADIO FREQUENCY COMMUNICATION

CROSS-REFERENCE TO RELATED PATENT APPLICATIONS

This application is a continuation-in-part of U.S. patent application Ser. No. 12/837,849, filed Jul. 16, 2010, which is a continuation of U.S. patent application Ser. No. 12/771,675, filed Apr. 30, 2010, which is a continuation of PCT/CN08/001452, filed Aug. 12, 2008, which claims priority to Chinese Patent Application No. 200710124354.7, filed Oct. 30, 2007. Additionally, this application is a continuation-in-part of: PCT/CN2008/001979 filed Dec. 5, 2008, which claims priority to Chinese Patent Application No. 200810067445.6, filed May 19, 2008; PCT/CN2008/001980, filed Dec. 5, 2008, which claims priority to Chinese Patent Application No. 200810067447.5, filed May 19, 2008; PCT/CN2008/001774, filed Oct. 21, 2008, which claims priority to Chinese Patent Application No. 200810067441.8, filed May 20, 2008; PCT/CN2008/001736, filed Oct. 15, 2008, which claims priority to Chinese Patent Application No. 200810067443.7, filed May 20, 2008; PCT/CN2008/001913, filed Nov. 24, 2008, which claims priority to Chinese Patent Application No. 200810067439.0, filed May 20, 2008; PCT/CN2008/001735, filed Oct. 15, 2008, which claims priority to Chinese Patent Application No. 200810067444.1, filed May 20, 2008; PCT/CN2008/001837, filed Nov. 3, 2008, which claims priority to Chinese Patent Application No. 200810142624.1, filed Jul. 29, 2008; and PCT/CN2008/001748, filed Oct. 17, 2008, which claims priority to Chinese Patent Application No. 200810142623.7, filed Jul. 29, 2008. The respective disclosures of the foregoing applications are incorporated herein by reference in their entirety.

BACKGROUND

Mobile communication terminals such as cell phones have become necessary for everyday life, and new application demands for electronic wallets based on mobile terminals, cell phone passes for an access control terminal, public transit use of cell phone, cell phone VIP cards have become urgent. If the mobile communication terminals possess a mobile payment function, e.g., electronic wallet, or an expenditure application function, e.g., cell phone pass for an access control terminal, it would bring a great convenience for people's daily lives.

In order to meet these new demands, the key technical problem to be overcome is RF signal transmission and antenna arrangement. Prior technical solutions are all based on modification to mobile terminals, e.g. current near field communication (NFC) is conducted by adding an RF chip and an antenna in a mobile terminal. However, if an existing cell phone is not modified, functions such as the cell phone electronic wallet would not be achieved. Thus, these solutions have not much value in practice.

Chinese patent 200620133544.6 discloses a solution which provides a SIM card RF antenna device for a mobile communication terminal. The device includes an RF antenna, RF antenna fittings, and a flexible connection member. The antenna fittings are used for carrying the RF antenna and fixing the RF antenna at an outer side of the battery of a mobile communication terminal. The flexible connection member is used for connecting the RF antenna to a SIM card that is at the inner side of the battery of the mobile communication terminal. Thus, some users can use a mobile communication terminal to achieve non-telecommunication functions by only adding some cost and without changing the cell phone or having a customized cell phone back cover. The solution of the above patent needs modification to mobile communication terminals and needs to provide a customized antenna and a flexible connection member to every user. However, embedding an RF antenna and a flexible connection member into a mobile communication terminal is complicated in process and difficult in implementation, and high on cost. These problems will severely limit the adoption of this solution. In addition, this solution is significantly limited by the internal structure of the cell phone and thus has no versatility.

Another Chinese patent, 200420121028.2, discloses a solution by adding an RF antenna to an existing cell phone terminal, adding an antenna area by modifying the cell phone, and adding an RF interface by modifying a SIM card. This solution still needs to modify a cell phone significantly, is complicated in process and costly; it has no commonality yet.

Chinese patent 200620026253.7 discloses a technical solution in which an RF antenna in a wireless RF payment cell phone is installed inside of a battery of the cell phone, arranged between the cell phone battery and a back cover of the cell phone, or attached to the outer surface of the back cover of the cell phone. The RF antenna is connected with a SIM card of the cell phone via contact points, connected with a smart IC card of the cell phone via contact points, or connected with a security chip in the cell phone via contact points. Same as the above, this solution is difficult to implement, costly, and has no versatility.

The technical solutions disclosed by the above patents all need to modify existing cell phones; currently, the number of existing cell phones is huge and there are 0.4 billion cell phones in China alone. There are a variety of cell phones and which are being upgraded frequently. Because these solutions have no versatility, are complicated for modification and are costly, they are difficult to be broadly adopted.

SUMMARY

Embodiments disclosed herein provide a simple, convenient, low cost method and device without the need of modification of a mobile terminal to realize wireless RF data exchange and to implement non-telecommunication functions such as cell phone wallet, cell phone pass for an access control terminal, etc., in order to solve a conflict between modification of the mobile terminal and realization of non-telecommunication functions.

A very high frequency RF IC card device is provided, which is configured to perform wireless RF data exchange and realizes functions including cell phone wallet, cell phone pass for an access control terminal, etc., without modifying the existing cell phone.

Embodiments disclosed herein can use the following technical solution to solve the technical problems.

An RF IC card device with very high frequency is designed and used, which comprises an IC device, an RF interface device, an RF antenna, an IC card interface and an RF interface; particularly, said RF interface device and the RF interface operate in a frequency band of ultra high frequency (UHF) or super high frequency (SHF); said RF antenna is directly integrated on an IC card; the RF IC card device with very high frequency exchanges data with other RF devices via the RF interface.

The RF interface device and the RF interface of the RF IC card device with very high frequency operate at a frequency of 2.4 GHz.

The RF IC card device with very high frequency, whose RF antenna is directly integrated on the IC card, is an IC device that is integrated with a corresponding RF antenna and comprises a user identification module.

The RF IC card device with very high frequency, whose RF antenna is directly integrated on the IC card, is a MMC card, an SD memory card, or an SDIO memory card.

The RF IC card device with very high frequency, whose RF antenna is directly integrated on the IC card, is a non-IC-card device which is similar to an IC card in functions and uses IC card interface protocols, including ISO 7816, SDIO, SD and MMC and use a flexible or super thin circuit board with a corresponding RF antenna integrated thereon.

The RF IC card device with very high frequency is applied to a mobile device including a mobile terminal, particularly a cell phone, a personal digital assistant PDA, or a lap-top computer. The RF IC card device with very high frequency is configured to exchange data with the mobile device via the IC card interface.

The RF IC card device with very high frequency is applied to a fixed apparatus including a personal computer, an industrial control computer, an automatic teller machine (ATM), or an access control terminal; the RF IC card device with very high frequency is configured to exchange data with the fixed apparatus via the IC card interface.

Compared with the existing technologies, the RF IC card device with very high frequency according to the embodiment avoids the drawbacks of the existing technologies and may the following advantages:

Using the RF device disclosed herein, an existing mobile terminal device can implement a function of near distance data exchange without modification or specifically adding a corresponding antenna so that the mobile terminal can be used as a cell phone wallet, a pass card for an access control terminal, a public transit card, a wireless identification card, etc.

The RF device takes advantage of a characteristic that a very high frequency signal has a very short wavelength, eliminates the need to lead out an external antenna, so as to allow RF signals to be refracted out from gaps between inside of the terminal and components of the enclosure. It solves a problem that some lower frequency RF signals such as 13.56 MHZ frequency cannot be used in some mobile or fixed terminals because wireless signals are shielded.

The RF device integrates the RF antenna into a substrate of flexible printed circuit board so that a prior IC device having a user identification module can have a function of RF communication added without replacement.

In one embodiment, a controller is provided configured to control a communication range between the RF device and the RF reader.

For example, the controller is configured to control the communication range by selecting RF parameters based on identification information of said terminal.

In another embodiment, the identification information comprises an International Mobile Equipment Identification Number (IMEI).

In a further embodiment, the RF parameters include an RF transmission power.

The controller can be part of the RF device, the RF reader, the mobile communication terminal, or part of a larger communication system. The relatively long-range communication afforded by the use of VHF, SHF, or UHF can be reduced, e.g., to less than 20 cm, by the controller to improve the security of the RF communication.

In one aspect, a terminal is provided including a radio frequency (RF) device comprising an RF antenna configured to exchange data with an RF reader; and a controller configured to control a communication range between the RF device and the RF reader, wherein said RF is in very high frequency (VHF), ultra high frequency (UHF), or super high frequency (SHF) range.

In another embodiment, the controller is configured to control the communication range by selecting RF parameters based on identification information of said terminal.

In a further embodiment, the identification information comprises an International Mobile Equipment Identification Number (IMEI).

In yet another embodiment, the RF parameters comprises an RF transmission power.

In still a further embodiment, the terminal is configured send said identification information through a short message.

In one embodiment, the terminal is configured to send the identification information to a network server.

In another embodiment, the terminal is further configured to receive RF transmission parameters from the network server.

In one embodiment, the terminal is further configured to prompt a user to calibrate the terminal if the RF transmission parameters are not received.

In one embodiment, the terminal comprises a cellular phone, and wherein the RF device comprises a SIM card and is configured to be disposed in a SIM slot of the cellular phone.

In one embodiment, the controller is configured to reduce a communication range afforded by the VHF, UHF, or SHF.

In one aspect, a controller is provided and configured to control a communication range between a radio frequency (RF) device and an RF reader, wherein the RF device comprises an RF antenna configured to exchange data with the RF reader, wherein said RF is in very high frequency (VHF), ultra high frequency (UHF), or super high frequency (SHF) range, wherein the controller is configured to measure a distribution of a signal field intensity from a terminal having the RF device disposed therein to determine whether the terminal and the RF reader are within a predetermined communication range.

In one embodiment, the controller comprises a detector array to measure said distribution.

In one embodiment, the detector array comprises a plurality of detectors substantially evenly distributed in a circular geometry.

In one embodiment, the controller is part of the RF reader.

In one embodiment, the detector array comprises a plurality of detectors having adjustable gains.

In one embodiment, the gains are adjustable by adjusting positions of the plurality of detectors.

In one embodiment, the detector array further comprises a plurality of amplifiers and attenuators, and wherein the gains are adjustable by adjusting parameters of the plurality of amplifiers and attenuators.

In another aspect, a method is provided to control a radio frequency (RF) communication range between a mobile terminal and an RF reader, wherein the mobile terminal has an RF device disposed therein, wherein the RF device comprises an RF antenna configured to exchange data with the RF reader, wherein said RF is in very high frequency (VHF), ultra high frequency (UHF), or super high frequency (SHF) range, the method comprising controlling the RF communication range from a range provided by said VHR, UHF, or SHF radiation.

In one embodiment, the method further includes measuring a signal field intensity distribution of the mobile terminal with a detector array; comparing the measured distribution with stored near-field maps for different types of mobile terminals; and determining whether the mobile terminal and the RF reader are within a predetermined communication range based on said comparing.

In one embodiment, the controlling the RF communication range comprises measuring a signal field intensity distribution of the mobile terminal with a detector array, wherein the detector array comprises a plurality of detectors having adjustable gains.

In one embodiment, the controlling the RF communication range comprises adjusting the gains by adjusting positions of the plurality of detectors.

In one embodiment, the the detector array further comprises a plurality of amplifiers and attenuators, and wherein said controlling the RF communication range comprises adjusting parameters of the plurality of amplifiers and attenuators.

In one embodiment, the controlling the RF communication range comprises selecting RF parameters based on identification information of said mobile terminal.

In one embodiment, the identification information comprises an International Mobile Equipment Identification Number (IMEI).

In one embodiment, the RF parameters comprises an RF transmission power.

In one embodiment, the method further includes sending from the mobile terminal said identification information through a short message.

In one embodiment, the method further includes receiving said identification information by a network server.

In one embodiment, the method further includes receiving at the terminal RF transmission parameters from the network server.

In one embodiment, the method further includes prompting a user to calibrate the mobile terminal if the RF transmission parameters are not received.

In one embodiment, the controlling comprises reducing.

In another aspect, a system is provided including a mobile terminal having a radio frequency (RF) device disposed therein, the RF device comprising an RF antenna configured to exchange data with an RF reader, wherein said RF is in very high frequency (VHF), ultra high frequency (UHF), or super high frequency (SHF) range; an RF reader; and a controller configured to control a communication range between the RF device and the RF reader.

In one embodiment, the system further includes a read-write converting device configured to provide an interface to a host computer, wherein said interface does not distinguish the VHF, UHF, or SHF range with a low-frequency, 13.56 MHz range.

In one embodiment, the mobile terminal comprises an integrated interface including a combined menu for the RF device and a conventional SIM too kit (STK) menu.

In one embodiment, the system further includes a short-range point-of-service (POS) machine; a long-range POS machine; an authorization server, wherein the short-range POS machine and the long-range POS machine operate in the same VHF, UHF, or SHF range.

In one embodiment, the RF reader is configured, as an access control device, to promulgate information to the mobile terminal through the RF device.

In one embodiment, the controller is part of the RF reader.
In one embodiment, the controller is part of the terminal.
In one embodiment, the controller is part of the RF device.

BRIEF DESCRIPTION OF THE DRAWINGS

FIG. 20 is the RF mobile terminal communications status database in one embodiment.

DETAILED DESCRIPTION OF THE PREFERRED EMBODIMENTS

Preferred embodiments will be described in detail with reference to the drawings.

Figure 1:
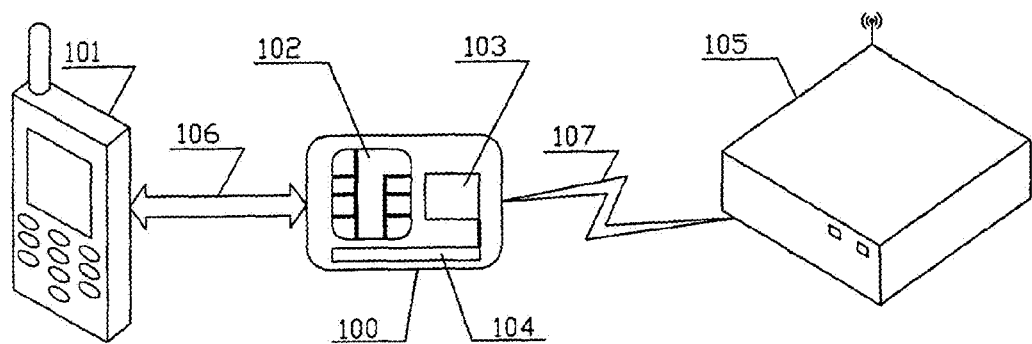
FIG. 1 is an application schematic view of an RF IC card device with very high frequency.

As shown in FIG. 1, a RF IC card device with very high frequency according to one embodiment includes an IC device 102, an RF interface device 103, an RF antenna 104, an IC card interface 106, and an RF interface 107. Said RF interface device 103 and the RF interface 107 operate in a frequency band of UHF (ultra high frequency) or SHF (super high frequency); said RF antenna 104 is directly integrated on an IC card 100 and connected to a mobile terminal device 101 via the IC card interface 106 to implement an operation of user identifying or an operation of data exchange, and it communicates with a high frequency RF card reader 105 via the high frequency RF interface 107 to implement an operation of data exchange so as to allow the mobile terminal device 101 and the high frequency RF card reader 105 to complete a data exchange operation, and many wireless applications such as cell phone wallet, cell phone pass for an access control terminal and wireless ID certificate can be implemented without the need of modifying existing mobile terminals.

Figure 2:
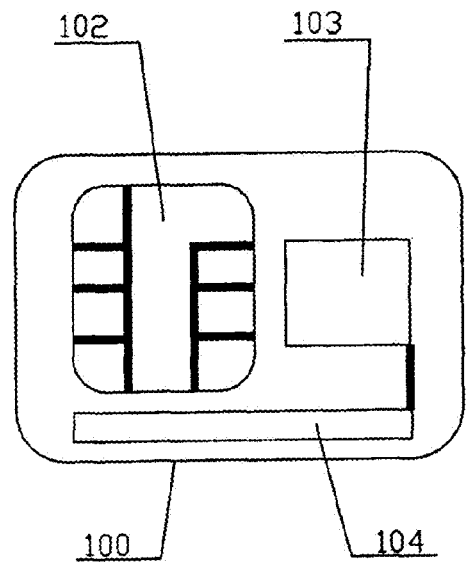
FIG. 2 is a schematic view of a device according to a first embodiment.

FIG. 2 is a schematic view of a first embodiment. The implementation is as follows: an IC device 102, an RF interface device 103, and an RF antenna 104 are packaged and fixed on the same substrate including an IC card, a circuit board or a flexible circuit board by soldering or other connection ways to form a very high frequency RF IC card 100.

Figure 3:
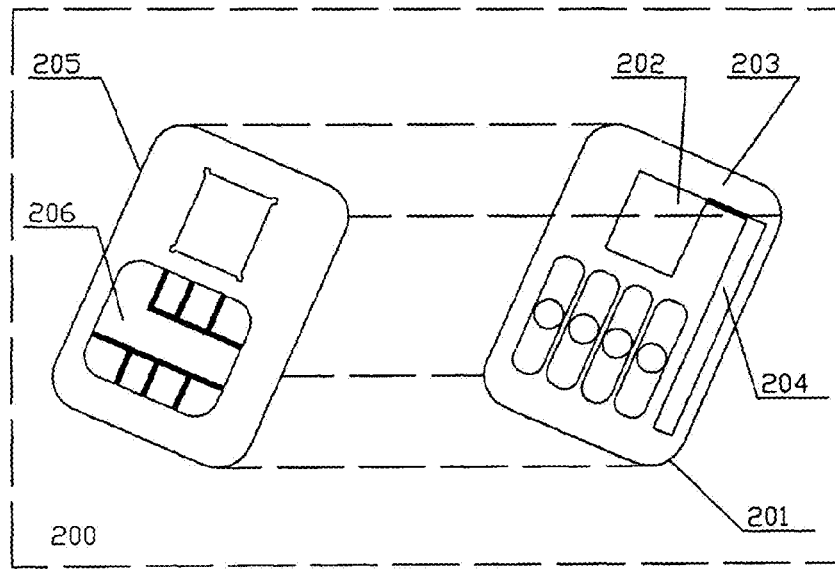
FIG. 3 is a schematic view of a device according to a second embodiment.

FIG. 3 is a schematic view of a second embodiment. The implementation is as follows: an auxiliary IC device 202 containing a very high frequency RF interface and an RF antenna 204 are fixed on a super thin substrate 203 to form a very high frequency RF IC device 201; and then an IC card 205 containing a main IC device 206 is combined with the IC device 201 to form a very high frequency RF IC card 200.

Figure 4:
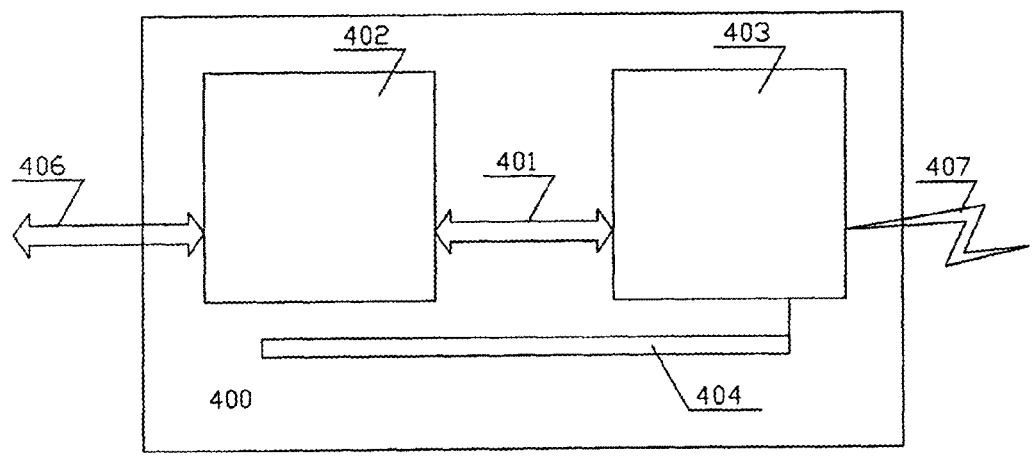
FIG. 4 is a block diagram according to one example configuration of the device.

FIG. 4 is a principle block diagram according to one configuration of the device. A very high frequency RF IC card 400 includes an IC device 402, an RF interface device 403, and an antenna 404. The IC device 402 and the RF interface 403 are connected by means of an interface 401 between the sub-modules, and the IC device 402 and the RF interface device 403 may be a chip or an IC module respectively; all devices and antenna are fixed on the same substrate to form a very high frequency RF IC card 400. The very high frequency RF IC card 400 is connected to a mobile device or a fixed apparatus by an IC card interface 406, and communicates with an RF device via a very high frequency RF interface 407.

Figure 5:
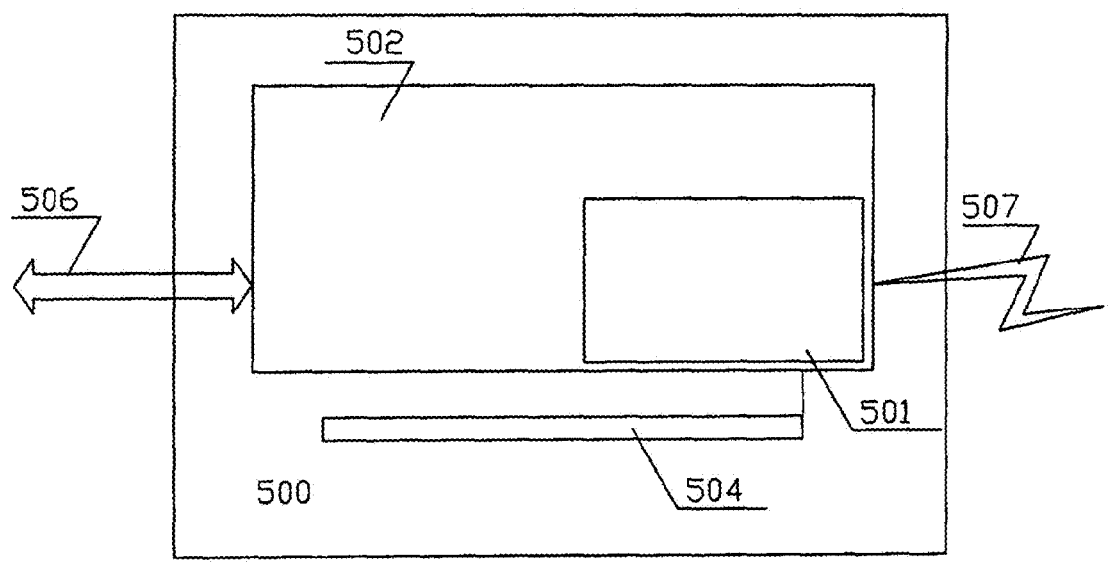
FIG. 5 is a block diagram according to another example configuration of the device.

FIG. 5 is a principle block diagram according to another configuration of the device. The device includes an IC device 502 containing a very high frequency RF interface circuit 501, and also includes an antenna 504. The IC device 502 may be a chip or an IC module; all devices and antenna are fixed on the same substrate to form a very high frequency RF IC card 500. The very high frequency RF IC card 500 is connected to a mobile device or a fixed apparatus by an IC card interface 506, and communicates with an RF device via a very high frequency RF interface 507.

The RF IC card device with very high frequency according to one embodiment has features of low cost, easy implementation, addition and expansion of wireless functions with respect to a prior terminal without modification to the existing terminal and having versatility.

In one aspect, a method of controlling effective communication distance of RF SIM card is provided. The method includes: building a mapping table of RF parameter for mobile communication terminal, reading the IMEI number of the mobile communication terminal with RF SIM card and determining the type of the mobile communication terminal under the control of central processing unit CPU of the RF SIM card; searching the RF parameters corresponding to the mobile communication terminal in the mapping table of RF parameter for mobile communication terminal, and using the parameters; informing the user to execute a RF parameter collation if the RF parameters corresponding to the mobile communication terminal can not be found in the mapping table of RF parameter for mobile communication terminal.

This method makes different mobile communication terminals with RF SIM card have effective communication distances that are almost the same. The RF parameters of the RF SIM card can be updated automatically even if the mobile communication terminal is changed, which avoids the events of reading a card unnecessarily, reading a card wrongly, and misreading a card, and it also provides convenience for users.

Figure 6:
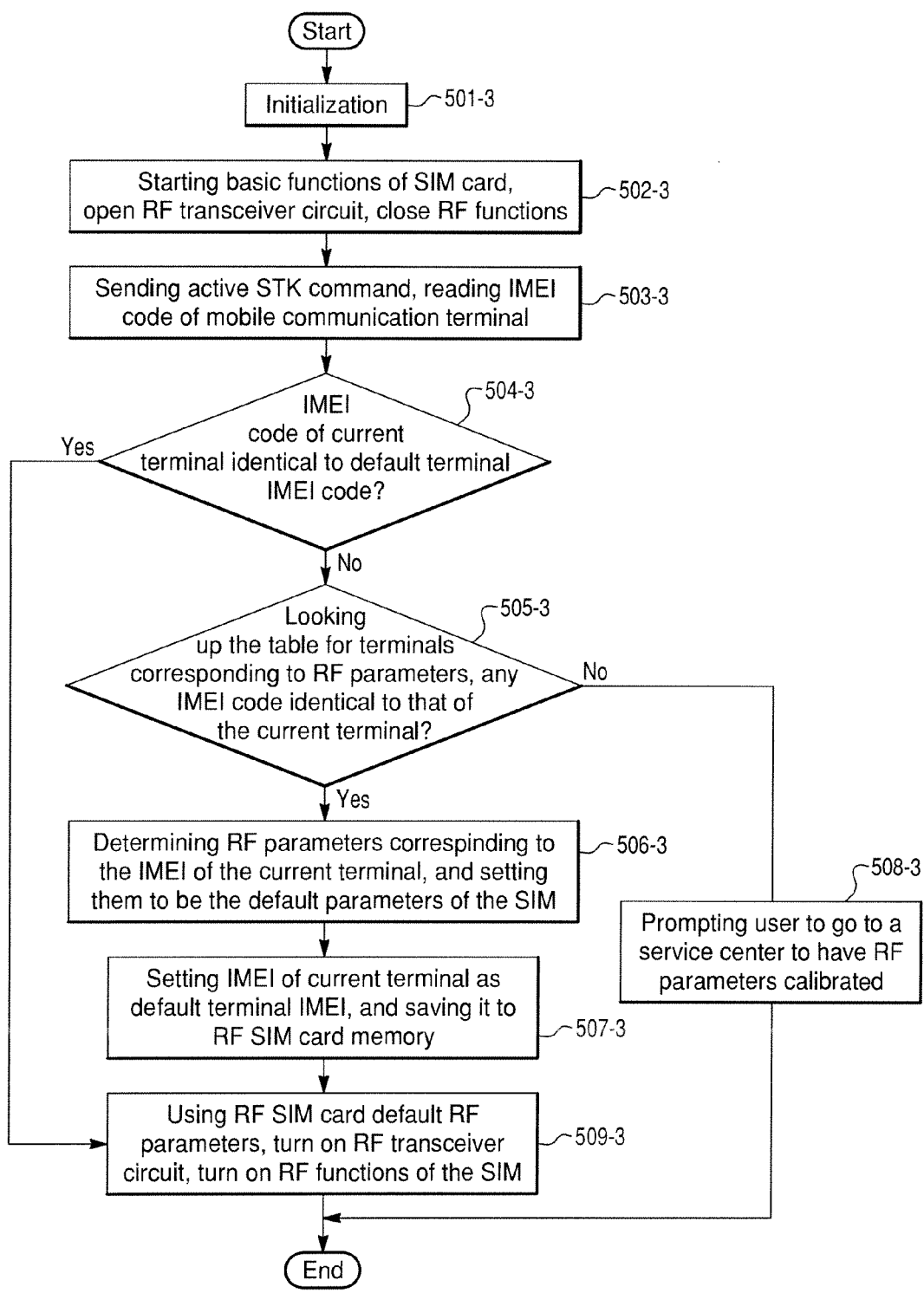
FIG. 6 is a flowchart illustrating a method for controlling an RF communication range using identification information of the mobile terminal.

As illustrated in FIG. 6, after initialization step in step 501-3, in step 502-3, the basic functions of SIM card are started, the RF transceiver circuit is break open, and the RF functions are closed. In step 503-3, active STK commands are sent, and IMEI code of the mobile communication terminal is read. In step 504-3, it was determined whether the IMEI code of the current mobile communication terminal is identical to the default terminal IMEI code. If "Yes," Step 509-3, using RF SIM card default RF parameters, turning on RF transceiver circuit, and turning on RF functions of the SIM card, are performed. If "No," step 505-3 is performed, including looking up the table for mobile communication terminals corresponding to RF parameters, and determining if any of the IMEI codes is identical to that of the current terminal. If "Yes," in step 506-3, then the RF parameters corresponding to the IMEI of the current terminal are determined, and these parameters are set to be the default parameters of the SIM card. If "No," in step 508-3, then the terminal can prompt the user to go to a service center to have the RF parameters calibrated. In step 507-3, the IMEI code of the current terminal is set as default terminal IMEI code, and is saved to RF SIM card memory.

Figure 7:
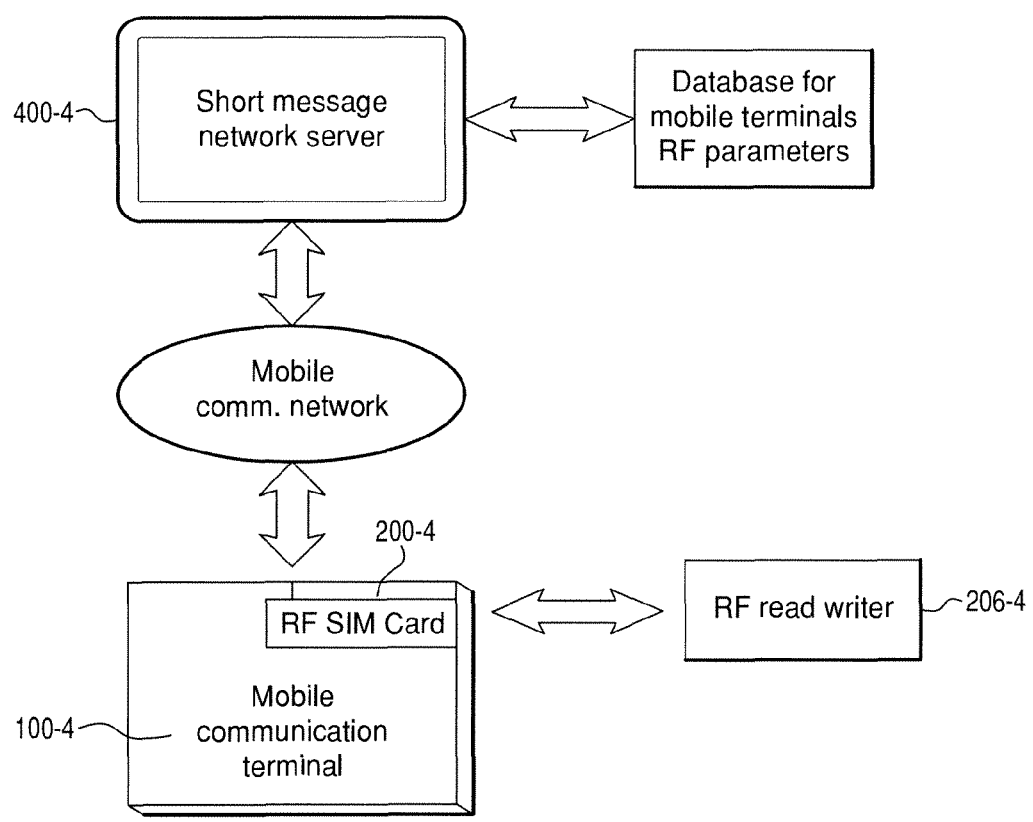
FIG. 7 is a block diagram illustrating a system including RF communication range control using short messages.

In another aspect, a method is provided for automatically adjusting the effective communication distance of the RF SIM card by short messages. The short message service (SMS) network known in the wireless communication art can be employed for this purpose. As illustrated in FIG. 7, the method can include: establishing a mobile communication terminal RF parameter database based on the mobile communication network server 400-4, under control of the central process unit (CPU) in the RF SIM card 200-4, reading out the IMEI code of the mobile communication terminal 100-4 and determining its type; searching the corresponding RF parameters of the mobile communication terminal in the database using one or more short messages, and applying the RF parameters; if the corresponding RF parameters of the mobile communication terminal cannot be found in the database, prompting the user to calibrate or correct the RF parameters. The calibration can be done at a service center. In this way, though the mobile communication terminal device is changed, the RF parameter of the RF SIM card can be updated automatically.

Figure 8:
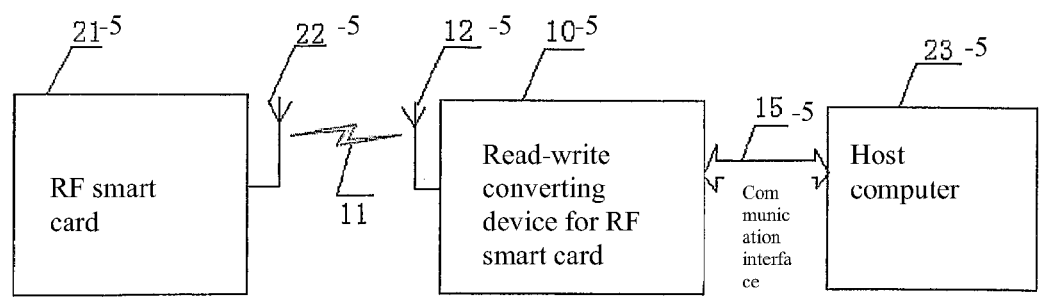
FIG. 8 is a block diagram illustrating an RF communication system including a read-write converting device.

In another aspect, as illustrated in FIG. 8, a read-write converting device 10-5 for a RF smart card 21-5 is provided. An RF chain 11 can be formed between the RF antenna 22-5 of the smart RF card and the RF antenna 12-5 of the read-write converting device 10-5, an RF transceiver unit, a management and control unit (MCU) and a host computer communication interface 15-5 for the host computer 23-5. Especially, said MCU provides a specific software interface to said host computer 23-5 by the program that runs inside the MCU. Through the interface, the host computer 23-5 does not need to discriminate the working frequency of the RF smart card 21-5, and regards it as an RF smart card working at 13.56 MHz and reads and writes the RF smart card working at other frequency according to the access mode of, for example, the Mifare card working at 13.56 MHz. The read-write converter has good compatibility, and the host computer specially designed for Mifare card needs only to be slightly modified to exchange data with the RF smart card that works at high frequency band (such as UHF band).

Figure 9:
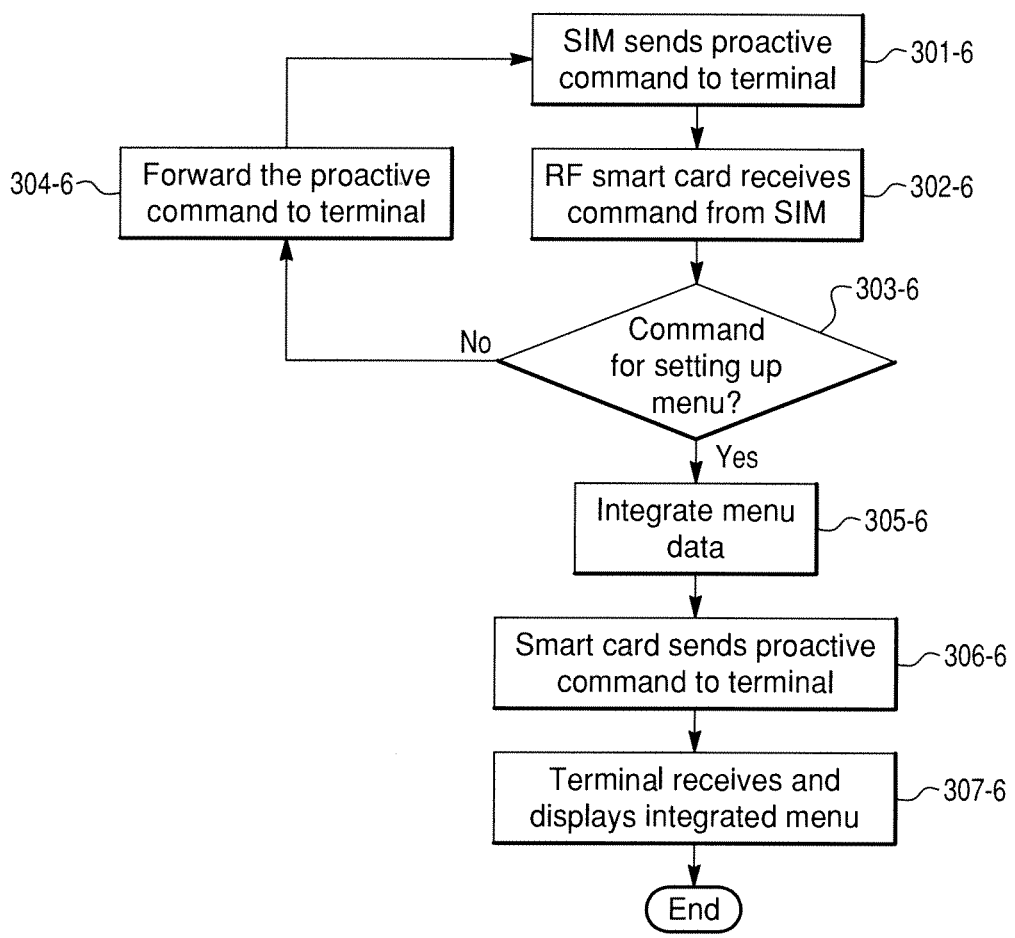
FIG. 9 is a flowchart illustrating the integration of a menu for an RF card with an STK menu for a conventional SIM card.

A method can be provided for integrating an RF smart card menu and a conventional SIM Application Toolkit (STK) menu, which is based on a type of RF SIM card. The method can comprise the following steps as illustrated in FIG. 9: in step 301-6, a conventional SIM card module sends a proactive command to a mobile terminal; instep 302-6, the RF smart card module determines in step 303-6 whether the received command is a menu set-up command, and forwards processing of said command to the corresponding module according to the determined result; the RF smart card module integrates its own menu operation command with the received menu command of the conventional SIM card module in step 305-6; the RF smart card module sends the now-integrated proactive command to the mobile terminal in step 306-6; the mobile terminal receives the integrated proactive command and provides an integrated display of the operation menu of the smart card module and the STK menu of the conventional SIM card module in step 307-6.

An advantage of one embodiment includes that the cellular phone having the RF SIM card disposed therein can communicate with an RF card reader at a distance of about 20 centimeters or less (i.e., a range similar to standard Near Field Communication range), even when installed inside different types of mobile terminals such as different types or brands of cell phones. This communication range is sufficient for purposes of an electronic wallet or a public transit fare card or for access control, among other applications. The longer (e.g., meters) communication range afforded by the use of VHF, UHF, or SHF bands can be reduced to shorter ranges (e.g., centimeters) by way of the embodiments disclosed herein to improve the security of the transactions.

It is another advantage of the claimed device, in the embodiment of the RF SIM card, that it can be plugged directly into a conventional SIM slot of a conventional cellular phone without modifications thereof. Thus, the RF functionalities added by the RF SIM card to the conventional cell phone can be integrated to the software of the cell phone, for example through the STK. The user can select and use the RF functionalities through the STK menu.

Figure 10:
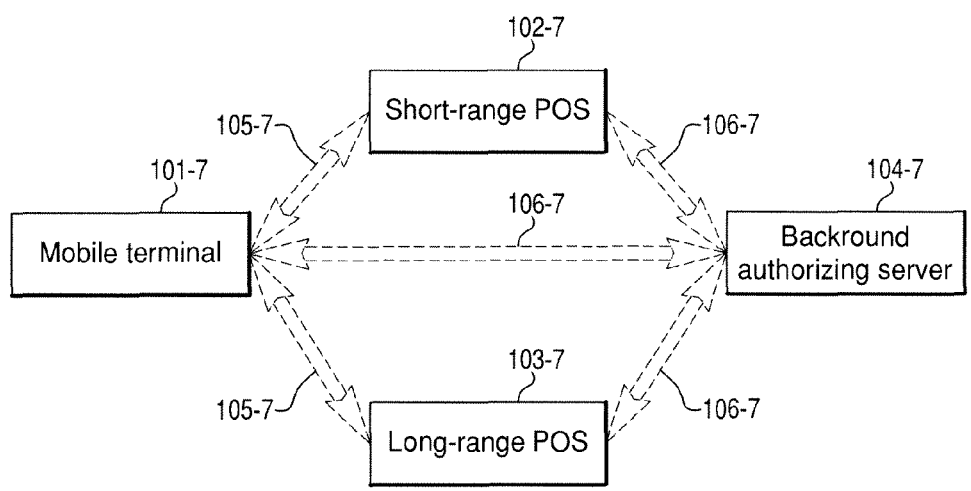
FIG. 10 is a block diagram illustrating a communication system including both a short-range POS machine and a long-range POS machine.

In another aspect, a system is provided for simultaneously supporting short and long distance communication involves. As illustrated in FIG. 10, the system can include a mobile terminal 101-7, a short range communication POS machine 102-7 and/or a long range communication POS machine 103-7, a background authorizing server 104-7, an authorization distributing passage 106-7 and an RF interface 105-7. The background authorizing server 104-7 transmits the key information to the mobile terminal 101-7 through the authorization distributing passage 106-7; the background authorizing server 104-7 transmits the identification code to the short range communication POS machine 102-7 or the long distance communication POS machine 103-7 through the authorization distributing passage 106-7; the mobile terminal 101-7 completes exchange of data with the short distance communication POS machine 102-7 or the long distance communication POS machine 103-7 through the RF interface 105-7. The system concurrently supports short-distance and long-distance communications, using a uniform frequency range, and ensures safety of communication and transaction in the two communication modes.

Figure 11:
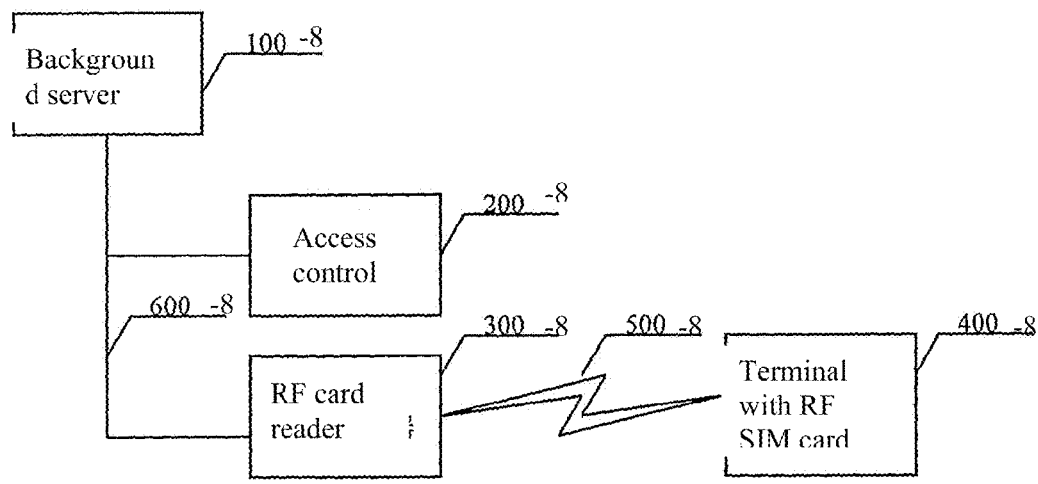
FIG. 11 is a block diagram illustrating a communication system including an access control and a reader configured to promulgate information to an RF device.

In accordance with one embodiment, as illustrated in FIG. 11, a promulgating information method and system can be used for identifying a mobile communications device 400-8 mounted with the RF SIM card 402-8, and promulgating information to the mobile communications device by a gate inhibition/checking work attendance system. The method comprises the steps that it sets a radio-frequency card reader 300-8 matched with the radio-frequency SIM card at the entrance of the gate inhibition/checking work attendance system, and the RF card reader communicates with the background server 100-8 of the gate inhibition/checking work attendance system, and the manager of the gate inhibition/checking work attendance system pre-establishes information which needs to be promulgated to related users in the background server 100-8. When a user swipes the card, the mobile communications device 400-8 receives and displays the information promulgated by the gate inhibition/checking work attendance system.

Communications terminals such as cellular phones have become popular for consumers. In addition to long-range communication functions, the cellular phones in accordance with embodiments disclosed herein can also have short range communication functions, and the cellular phones can be used as an electronic wallet for payment functions, etc. The cellular phones can become intelligent terminals, of which monetary value can be recharged to the electronic wallet, which can be used in transactions and for identity certification.

The short-range cellular phone communications solution based on RF SIM described above has attracted widespread attention due to its advantages such as being simple and free from any need for modifications of the phones. In this solution, the RF SIM uses the UHF or VHF technology, so that the RF signal transmit from the cell phone, thus making it possible for a cellular phones to have short range communications functions without being modified. However, due to major differences in the shielding effect of different phones, some cell phones have a greater RF signal transmission strength due to a poor shield effect, with a communications range as much as 1 m, whereas for some cell phones, their RF signal cannot be transmitted due to a particularly good shield effect, thus making it impossible to send and receive data and consummate a transaction. Having a large variety of cellular phones in the market, it is very difficult to precisely control the range covered by an RF signal.

Many applications such public transit swipe cards have rigorous requirements for the effective range of a transaction. An overly long range (such as more than 10 CM) can bring about great security issues. Therefore, for cellular phones, while their short range communication functions are included, the effective range of the short-range transactions must also be controlled.

The non-contact card technology specified by the ISO 14443 protocol or the RFID technology specified by ISO 18000 already have short ranges without controlling the RF communication range. In these technologies, the cards are passive and only work by extracting energy from coupling with the card reader through sensing, thus achieving communications with a card reader. The cellular phones based on RF SIM cards use an active approach in the UHF frequency band, leaving them unable to use the passive technology to control the range of communications. Due to the strong penetrating abilities of the UHF frequency band RF signals, the RF communication range can be undesirably long if no controls are imposed.

In existing technology, methods such as adjusting the RF signal emission strength and the reception sensitivity of a card reader may be used to control the communications range, but it is difficult for such methods to achieve reliable short range communications due to the impact of factors such as standing waves and signal reflex. In particular, these methods cannot prevent malicious data communications attacks.

The existing technology to control the mobile terminal RF communication range has the following deficiencies: (1) the close range communications of cell phones based on RF SIM use an active method and basically use the UHF frequency band, leaving them unable to use the passive technology to control the range of communications; (2) and the method to adjust the transmission strength of the cell phone RF signal and the receiving sensitivity of a card reader in order to control the range of communications is subject to the impact of a plurality of factors, such as standing waves and signal reflex, etc., making it difficult to achieve reliable close range communications, in particular, it is vulnerable to a malicious data communications attack.

A study of the pattern of transmission of an RF signal over the air reveals that the magnetic filed and electric field characteristics of an RF signal in an area near the signal source are significant, and in an area farther away, its magnetic filed characteristics are less significant, thus causing the distribution of electromagnetic field intensity (hereinafter referred to as "field intensity") in an area near the signal source to be irregular. Actual observations and tests also indicate again that the distribution of the RF signal field intensity of each cell phone with close range communications functions in a nearby area is quite uneven (generally $\lambda/2\pi$, where $\lambda$ is the wavelength and referred to as the near field) and shows a major difference along with differences in the type of mobile terminal. Such an RF near-field distribution is referred to as a near field map; whereas in an area outside the near field, the distribution of RF signal field intensity is substantially even. The distribution of such field intensity has nothing to do with the type of RF communications terminal. An example embodiment disclosed herein employs these field properties and proposes a simple and low cost solution that is easy to implement. Such a solution makes it possible for the data communications range between the RF communications terminals and the RF communications devices to be controlled within a near field range, thus guaranteeing the security of transactions while even also being able to fundamentally eliminate threats such as a remote malicious data communications attack, etc.

A system and method to control the range of mobile terminal RF communications are provided to create a corresponding near field map for each type of RF terminal on the RF control terminal through testing methods; use the detector to compare the field intensity of the tested current RF mobile terminal with the degree of match of its near field map obtained through a match algorithm; compare the degree of match with the threshold value preset in the RF control terminal corresponding to such a type of RF mobile terminal, thus determining whether the distance between current RF mobile terminal and the RF control terminal is within the prescribed range. The solution allows the data communications range between the RF communications terminal and the RF communications device to be reliably controlled within a near field range, thus guaranteeing the security of transactions while even also being able to fundamentally eliminate threats such as a remote malicious data communications attack, etc.

In one embodiment, a system is provided that controls the range of RF communications and in particular includes an RF mobile terminal and an RF control terminal with a built in RF SIM card.

The RF control terminal receives the signal field strength of an RF mobile terminal and tests the distribution of such a signal field intensity; the RF control terminal performs a mathematical analysis and calculation of the distribution of the field intensity according to the prescribed requirements, thus determining whether the RF mobile terminal is within the preset communications range.

The RF control terminal includes a detector array and a host system. The host system is connected to the detectors on a detector array and has the ability to acquire, calculate and process the field intensity values and their pattern of distribution.

Shapes of various detectors on the detector array include round, circular, stick shape, arc, W shape or square; various detectors on the detector array may be made of materials such as ceramic, magnetic materials or copper.

The detector array radio outside the RF control terminal comprises an N number of detectors that are arranged at 360°/N to each other at geometric locations. The interior of the RF control terminal also comprises an N number of detectors that are arranged at 360°/N to each other at geometric locations. Here, N is a positive integer $\geq 2$.

The host system can be achieved with a single chip microcomputer system.

A method to control the range of mobile terminal RF communications is provided. Based on a system to control the range of mobile terminal RF communications, the system includes an RF mobile terminal and an RF control terminal with a built in RF SIM card. The method comprises the following steps:

(A) Through testing, within the RF control terminal, create a corresponding near field map for each type of RF mobile terminal;

(B) Use a detector array to test the signal field intensity of the current RF mobile terminal and its distribution;

(C) Regarding the relevance between the current RF mobile terminal signal field intensity and its distribution tested and the near field map preset within the RF control terminal, obtain a match degree through a match algorithm;

(D) Compare the match degree obtained in step C with the relevance threshold preset that corresponds to such an RF mobile terminal stored in the RF control terminal, thus determining whether the distance between the current RF mobile terminal and the RF control terminal is within the prescribed range.

In step A, what the near field map reflects is the corresponding relationship between distance $\tau$ between various types of RF mobile terminals and the RF control terminals and the signal field intensity of various detectors on the detector array. Arrange the measured values of various detectors at this field intensity in a series. After calculating various elements in this series, obtain field intensity $\sigma$ at this field intensity when the distance of the RF mobile terminal to the RF control terminal is $\tau$;

In step B, the field intensity of the current RF mobile terminal is also a set of series, wherein the elements are field intensity values for various detectors on the detector array obtained through testing.

In step C, the match algorithm can be an average value calculation, a variance calculation or a combination thereof.

Various elements of the series can be obtained all at once during testing or their average values can be obtained after repeated measurements during testing.

In step D, the threshold value used for comparison can be preset on the RF control terminal depending on the actual circumstances, or can also be stored within the RF mobile terminal. When communications are set up, inform the RF control terminal.

The near field map and elements of the corresponding series of the field intensity of current RF mobile terminals may be arranged in the same sequence.

Advantages of the example embodiment may include: 1. The solution is a simple low cost solution that is easy to implement; and 2. The solution makes it possible to reliably control the data communications range between the RF communications terminal and the RF communications devices within the near field range, thus guaranteeing the security of transactions while even also being able to fundamentally eliminate threats such as a remote malicious data communications attack, etc.

Figure 12:
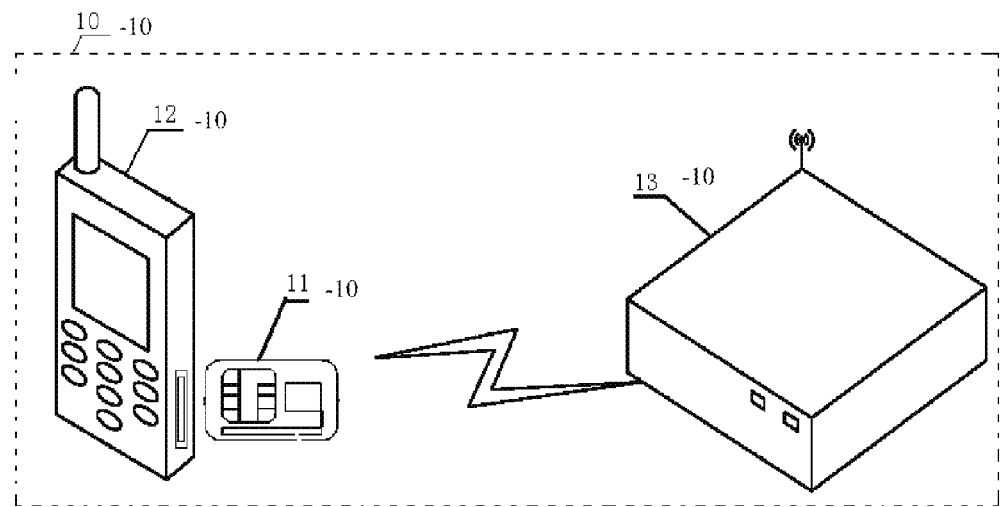
FIG. 12 is a schematic of an application of the system in one embodiment.

As shown in FIG. 12, the system 10-10 in the example embodiment controls the range of mobile terminal RF communications, and includes an RF mobile terminal 12-10 and an RF control terminal 13-10 with a built in RF SIM card 11-10.

The RF control terminal 13-10 receives the signal field intensity of the RF mobile terminal 12-10 and tests the distribution of this signal field intensity; the RF control terminal 13-10 performs a mathematical analysis and calculation of the distribution of the field intensity according to the prescribed requirements, thus determining whether the RF mobile terminal is within the preset communications range.

The RF control terminal 13-10 includes a detector array 131-10 and a host system 132-10. The host system is connected to the detectors on the detector array 131-10 and has the ability to acquire, calculate and process the field intensity values and their pattern of distribution.

Figure 13:
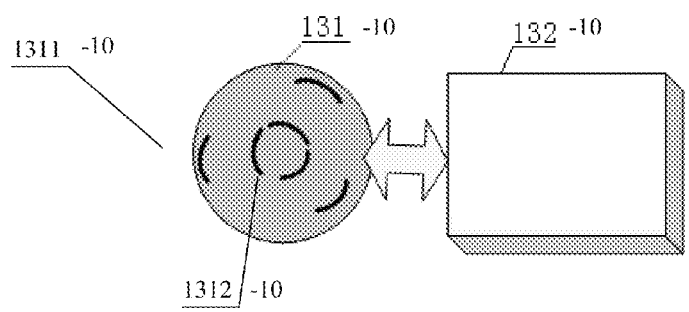
FIG. 13 is a schematic of the composition of the RF control terminal and detector array in one embodiment.
Figure 14:
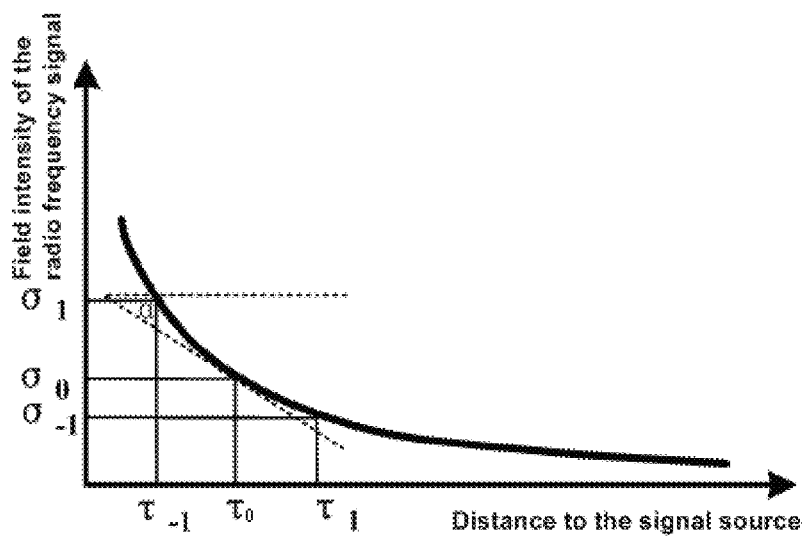
FIG. 14 is a drawing showing that the RF mobile terminal field intensity changes with distance.

As shown in FIG. 13, shapes of various detectors on the detector 131 array include round, circular, stick shape, arc, W shape or square; various detectors on the detector array 131-10 may be made of materials such as ceramic, magnetic materials or copper.

The detector array 131-10 of the RF control terminal 13-10 comprises an N number of detectors 1311-10 that are arranged at 360°/N to each other at geometric locations. The interior of the RF control terminal 13-10 also comprises an N number of detectors 1312-10 that are arranged at 360°/N to each other at geometric locations. Here, N is a positive integer ≥2.

As shown in FIG. 13, in the illustrative embodiment, N=3, that is, three detectors are used. The detector array 131-10 outside the RF control terminal 13-10 comprises three detectors 1311-10 that are set at an angle of 120 degrees to each other and inside the RF control terminal 13-10, comprises three detectors 1312-10 that are set at an angle of 120 degrees to each other.

The host system 132-10 is achieved by using a single chip microcomputer system.

A system 10-10 based on controlling the range of mobile terminal RF communications, the system includes an RF mobile terminal and an RF control terminal with a built in RF SIM card and in particular comprises the following steps:

(A) Through testing, within the RF control terminal 13-10, create a corresponding near field map for each type of RF mobile terminal 12-10.

(B) Use the detector array 131-10 to test the signal field intensity of the current RF mobile terminal 12-10 and its distribution.

(C) Regarding the relevance between the signal field intensity of the current RF mobile terminal 12-10 and its distribution tested and the near field map stored within the RF control terminal 13-10, obtain a match degree through a match algorithm; and (D) Compare the match degree obtained in step C with the relevance threshold preset that corresponds to such an RF mobile terminal 12-10 preset in the RF control terminal 13-10, thus determining whether the distance between the current RF mobile terminal 13-10 and the RF control terminal 12-10 is within the prescribed range.

In step A, what the near field map reflects is the corresponding relationship between distance $\tau$ between various types of RF mobile terminals 12 and the RF control terminals 13-10 and the signal field intensity of various detectors on the detector array. Arrange the measured values of various detectors at this field intensity in a series. After calculating various elements in this series, obtain field intensity $\sigma$ at this field intensity when the distance of the RF mobile terminal 12-10 to the RF control terminal 13-10 is $\tau$;

In step B, the field intensity of the current RF mobile terminal 12-10 is also a set of series, wherein the elements are field intensity values for various detectors on the detector array 131 obtained through testing.

In step C, the match algorithm can be an average value calculation, a variance calculation or a combination thereof.

In step D, the threshold value used for comparison can be preset on the RF control terminal 13-10 depending on the actual circumstances, or can also be stored within the RF mobile terminal 12-10. When communications are set up, inform the RF control terminal 13-10.

The near field map and elements of the corresponding series of the field intensity of current RF mobile terminal 12-10 are arranged in the same sequence.

Figure 15:
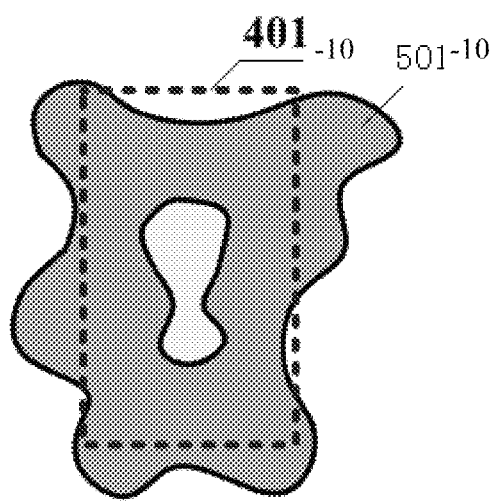
FIG. 15 is a map illustration of the RF mobile terminal when it is at a distance of $\tau_{-1}$ from the RF control terminal, whose field intensity is greater than $\sigma_{-1}$.
Figure 16:
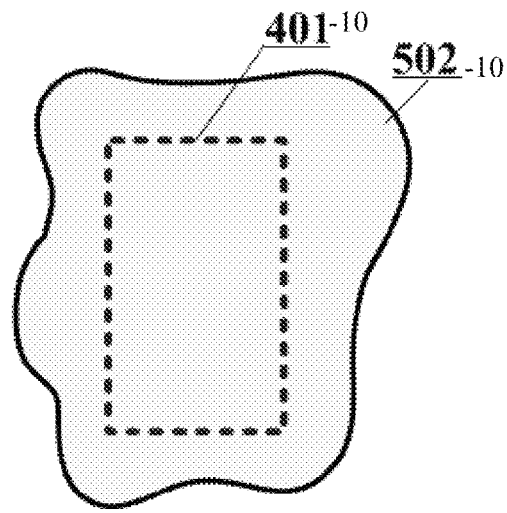
FIG. 16 is a map illustration of the RF mobile terminal when it is at a distance of $\tau_0$ from the RF control terminal, whose field intensity is greater than $\sigma_0$.
Figure 17:
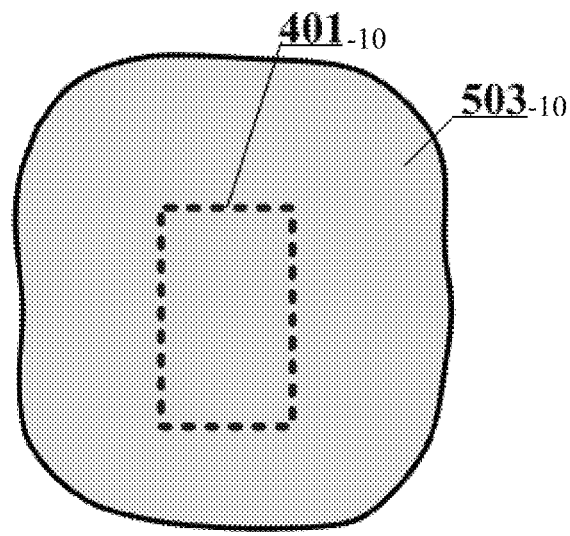
FIG. 17 is a map illustration of the RF mobile terminal when it is at a distance of $\tau_1$ from the RF control terminal, whose field intensity is greater than $\sigma_1$.
Figure 18:
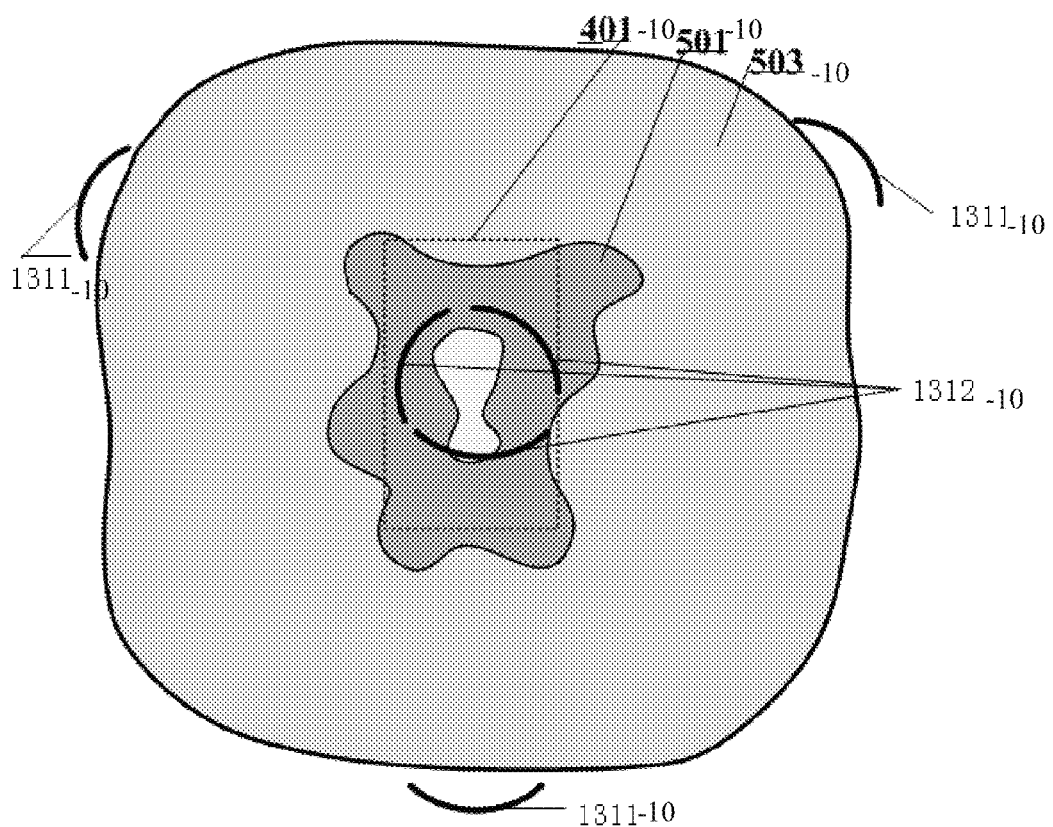
FIG. 18 is an illustration of the distribution of the detector array on the RF control terminal.

In FIG. 15, numeral reference 401-10 represents the projected range of the position when the RF mobile terminal 12-10 communicates with the RF control terminal 13-10 at a distance. In FIG. 15 and FIG. 18, the area represented by 501-10 is a map distribution for the RF mobile terminal 12-10 when it is at a distance of $\tau_{-1}$ from the RF control terminal 13-10 and when its field intensity is greater than $\sigma_{-1}$. In FIG. 16 and FIG. 18, the area represented by 502-10 is a map distribution for the RF mobile terminal 12-10 when it is at a distance of $\tau_0$ from the RF control terminal 13-10 and when its field intensity is greater than $\sigma_0$. In FIG. 17 and FIG. 18, the area represented by 503-10 is a map distribution for the RF mobile terminal 12-10 when it is at a distance of $\tau_1$ from the RF control terminal 13-10 and when its field intensity is greater than $\sigma_1$.

As shown in FIG. 18, when a test is performed, in the detector array 131-10, first, set the rough position of RF mobile terminal 12-10 during communications as required. As shown by numeral reference 401-10 in FIG. 18, the detector array 131-10 internally comprises three detector arrays 1312-10 that are set at 120 degree angles to each other and externally comprises three detector arrays 1311-10 that are set at 120 degree angles to each other, wherein the average distance of the internal detector arrays from the center of the RF mobile terminal 12-10 is less than $\tau_{-1}$ and the average distance of the external detector arrays from the center of the RF mobile terminal 12-10 is greater than $\tau_1$.

The normal variations and replacements by technicians in the present field shall fall within the scope of protection. For the example, the embodiment can also be replaced by indices similar to the field intensity. Connecting various detectors to an RF receiving device and the use of the bit error rate or communications success rate for the RF signal received can also generate the same effect.

The RF control terminal can test the communications status of the RF mobile terminal through the detector array, and it performs an analysis of the test result, thereby determining the communications range of the RF mobile terminal.

The RF control terminal can include a card reader or be part of the card reader.

The detector array includes an antenna or coupling structure with different gain and radiation characteristics. Different reception gains are achieved by adjusting the positions of the detector.

The detector array includes a set of beacon detectors, a set of minimum scale detectors and at least one set of scale detectors. Each set of detectors includes at least one detector. Each detector has a corresponding amplifier and attenuator. By adjusting the parameter values of the amplifier and attenuator, the purpose of increasing the number of amplifications of the detector array may be achieved.

Adjust the parameter values of the amplifier and attenuator, in order to increase the number of amplifications of one of the sets of detectors in the detector array to a larger value A1, which serves as the beacon detector, and use it first for communications with RF mobile terminal.

Adjust the parameter values of the amplifier and attenuator, in order to increase the number of amplifications of another set of detectors in the detector array to a smaller value A2, which serves as the minimum scale detector, so that the RF mobile terminal can only communicate with it at a very close range.

Adjust the parameter values of the amplifier and attenuator, in order to adjust the number of amplifications of each remaining set of detectors in the detector array to the only corresponding value between A1 and A2, which serves as the scale detector, and use it to determine the rough range of the RF mobile terminal.

The beacon detector and the scale detector can be merged into one set.

The number of amplifications of the beacon detector, the minimum scale detector and scale detector can be determined through test data or experience and can be achieved by adjusting the parameter values of the amplifier and the attenuator.

A method is provided to achieve reliable close range communications by using a detector array. Based on the use of a detector array, the system includes an RF mobile terminal and an RF control terminal with a built in RF SIM card, comprising the following steps:

(A) Through testing, for each type of RF mobile terminal, create its communications status database. The databases includes whether various sets of detectors can communicate with RF mobile terminals at each test range and the number of amplifications of each detector at such a range.

(B) Write the communications status database into the RF mobile terminal or RF SIM card, which serves as the communications status database of such an RF mobile terminal itself.

(C) The RF mobile terminals first communicate with the RF control terminal through the beacon detector and informs the RF control terminals of the communications status databases stored therein. The RF control terminals will adjust the parameter values of their amplifiers and attenuators according to the parameter values each set of detectors in the databases correspond to.

(D) The RF mobile terminals communicate with each set of detectors of the RF control terminals at a certain test range and record the test results.

(E) The actual test results and the information recorded by the communications status databases are compared, thus determining the rough range of the communications range between the RF mobile terminals and the RF control terminals.

The range of the test in step A is the communications range between the RF mobile terminals and the RF control terminals, and can be freely selected according to the actual circumstances.

The detector array also includes position limiting detectors, used to ensure that the RF mobile terminals cannot communicate with the RF control terminals at a certain target range, in order to guarantee security of the communications range.

Compared with the existing technology, advantages of the embodiments disclosed herein may include: (1) the solution according to one embodiment is simple, low cost solution that is easy to implement; (2) the solution according to one embodiment make it possible to control the data communications range between the RF communications terminal and the RF communications devices within the near field extent, thus guaranteeing the security of transactions while also being able to fundamentally ensure the reliability of communications.

In one aspect, a system 10-10 as shown in FIG. 12 is provided using a detector array to achieve reliable, short-range communications. The system can include an RF mobile terminal 12-10 and an RF control terminal 13-10 with a built in RF SIM card 11-10. The communication method can comprise the following steps: for each type of RF mobile terminal 12-10, its communications status database is created; when the RF mobile terminal 12-10 and RF control terminal 13-10 to be tested engage in communications, the RF mobile terminal 12-10 communicates with various sets of detectors 131-10 of the RF control terminal 13-10 at a certain test range; and the actual test results and the information recorded by the communications status database are compared, thus determining the rough range of the communications range between the RF mobile terminal 12-10 and the RF control terminal 13-10. This makes possible the control of the data communications range between an RF communications terminal and RF communications devices within the near-field extent, thus guaranteeing the security of transactions while also being able to ensure fundamentally the reliability of communications.

Figure 19:
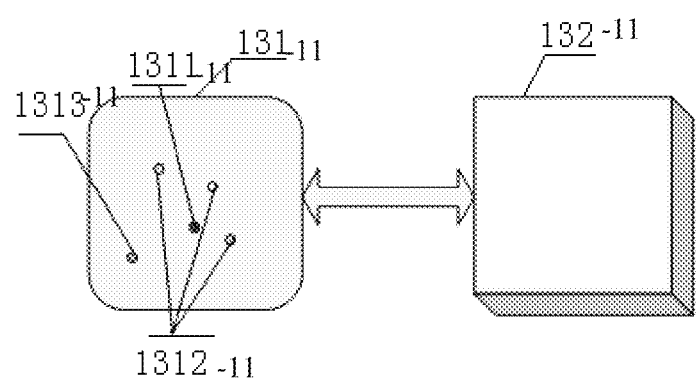
FIG. 19 is a schematic of the RF control terminal and detector array in one embodiment.

As shown in FIG. 19, the detector array 131-11 includes an antenna or coupling structure with different gain and radiation characteristics. Different reception gains are achieved by adjusting the positions of the detector.

As shown in FIG. 19, the detector array 131-11 includes a set of beacon detectors 1311-11, a set of minimum scale detectors 1313-11 and at least one set of scale detectors 1312-11. Each set of detectors includes at least one detector. Each detector has a corresponding amplifier and attenuator. By adjusting the parameter values of the amplifier and attenuator, increasing the gains of the detector array 131 may be achieved.

As shown in FIG. 19, an example device uses a set of beacon detectors 1311, a set of minimum scale detectors 1313 and three sets of scale detectors, and their emission power and reception sensitivity may be adjusted by adjusting the corresponding amplifiers and attenuators.

An example method includes adjusting the parameter values of the amplifier and attenuator, in order to increase the gains of one of the sets of detectors in the detector array 131-11 to a larger value A1, which serves as the beacon detector 1311-11, and use it first for communications with RF mobile terminal 12-10.

The above step is followed by adjusting the parameter values of the amplifier and attenuator, in order to increase the gains of another set of detectors in the detector array 131-11 to a smaller value A2, which serves as the minimum scale detector 1313-11, so that the RF mobile terminal 12-10 can only communicate with it at a very close range.

Further, adjusting the parameter values of the amplifier and attenuator, in order to adjust the gains of each remaining set of detectors in the detector array 131-11 to the only corresponding value between A1 and A2, which serves as the scale detector 1312-11, and use it to determine the rough range of the RF mobile terminal 12-10.

As shown in FIG. 19, the method can include adjusting the number of amplifications of the scale detectors 1312-11 in the three sets respectively to 0.3×, 0.4×, and 0.5×; adjusting the number of amplifications of the minimum scale detector 1313-11 to 0.2×; and adjusting the number of amplifications of the beacon detector 1311-11 to 1×. The higher the emission power of the scale detectors, the greater the distance of communications with the RF mobile terminal 12-10 can be.

The beacon detector 1311-11 and the scale detector 1312-11 can be merged into one set.

The number of amplifications of the beacon detector 1311-11, the minimum scale detector 1313-11 and scale detector 1312-11 can be determined through test data or experience and can be achieved by adjusting the parameter values of the amplifier and the attenuator.

In one aspect, a method is provided to achieve reliable close range communications by using a detector array. Based on a system 10-10 to achieve reliable close range communications by using a detector array, the system can include an RF mobile terminal 12-10 and an RF control terminal 13-10 with a built in RF SIM card. The method can include the following steps:

A. Through testing, for each type of RF mobile terminal 12-10, creating its communications status database. The databases includes whether various sets of detectors 131-11 can communicate with the RF mobile terminals 12-10 at each test range and the number of amplifications of each detector at such a range.

B. Writing the communications status database into the RF mobile terminal 12-10 or the RF SIM card 11-10, wherein the RF SIM card 11-10 can serve as the communications status database of such an RF mobile terminal 12-10 itself.

Figure 21:
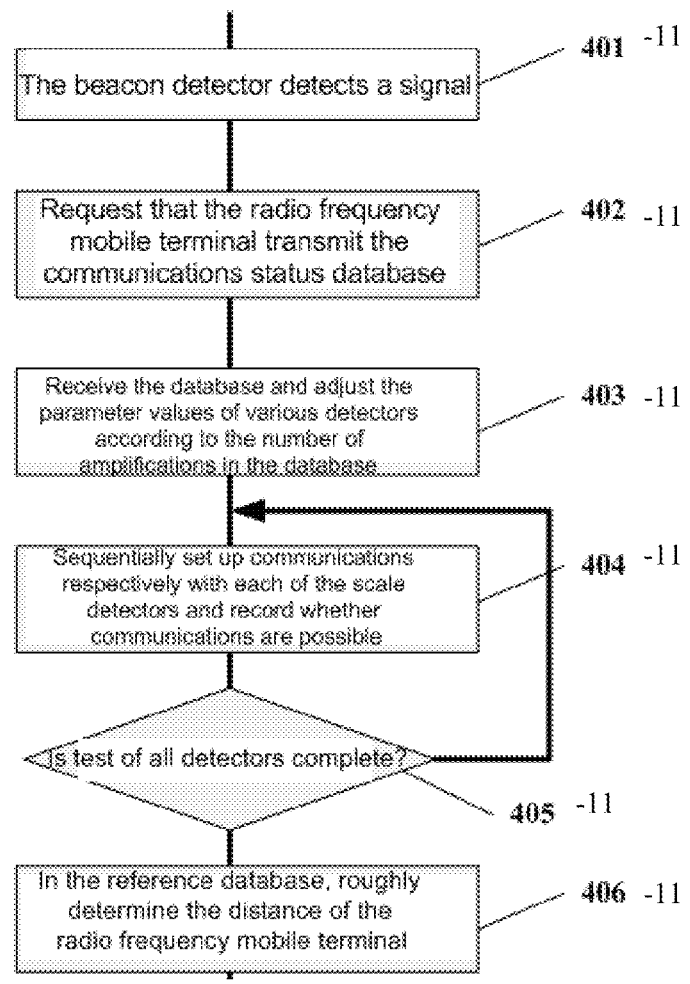
FIG. 21 is process chart for determining range using the method according to one embodiment.

C. As shown by step 401-11 in FIG. 21, the RF mobile terminals 12-10 to be tested first communicate with the RF control terminal 13-10 through the beacon detector 1311-11 and inform the RF control terminal 13-10 of the communications status databases stored therein, as shown by step 402-11. The RF control terminal 13-10 will adjust the parameter values of their amplifiers and attenuators according to the parameter values each set of detectors in the databases correspond to, and refer to step 403-11 for this process.

D. As shown in step 404-11, the RF mobile terminals 12-10 communicate with each set of detectors 131-10 of the RF control terminals at a certain test range, record the test results and make a determination as to whether all detectors have completed a test, as shown in step 405-11.

E. As shown in step 406-11, the actual test results and the information recorded by the communications status databases are compared, thus determining the rough range of the communications range between the RF mobile terminal 12-10 and the RF control terminals 13-10.

When the steps described in A are performed, each type of mobile terminal at various test ranges are tested. As shown in FIG. 19, the embodiment has respectively tested the status information of each of the detectors of the RF terminal 12-10 when the RF control terminal 13-10 is at a distance of 0 CM, 2 CM, 5 CM, 10 CM, 15 CM, 20 CM, 30 CM, and 50 CM. Such status information includes whether various sets of detectors can communicate with RF mobile terminals 12 at each test range and the number of amplifications of each detector at such a range.

After the RF control terminal 13-10 creates the status information database for each type of RF mobile terminals 12-10, concurrently writing the status information databases into the corresponding RF mobile terminals 12-10, so that when they establish communications, such information database can be sent to RF control terminals 13-10 in advance.

In step C, place the RF mobile terminals 12-10 to be tested at a certain range. When they communicate with the RF control terminals 13-10 at a certain range, the RF mobile terminals 12-10 send the status databases of their own that have been created to the RF control terminal 13-10. After the RF control terminals 13-10 receive the status information databases sent by RF mobile terminal 12-10, they adjust the number of amplifications of the detectors. As shown by steps 404-11 and 405-11 in FIG. 21, again test whether they can communicate with RF mobile terminals 12-10. As shown by step 406-11 in FIG. 4, after all detectors complete testing, a comparison is performed with the communications status databases received. If the results recorded are that communications are only possible with the 5 CM scale detector, the 2 CM scale detector and the minimum scale detector, then by checking the communications status databases, one may learn that the rough range of the current mobile RF communications terminals is 5 CM.

The test range described in step A is the communications range between RF mobile terminals 12-10 and RF control terminals 13-10 and can be freely selected according to the actual circumstances.

The detector array 131-11 also includes position limiting detectors, used to ensure that the RF mobile terminals 12-10 cannot communicate with the RF control terminals 13-10 at a certain target range, in order to guarantee security of the communications range.

What is claimed is:

1. A radio frequency (RF) device configured to be disposed in a terminal, the RF device comprising:
    an RF antenna configured to exchange data with an RF reader; and
    a controller configured to control a communication range between the RF device and the RF reader by selecting RF parameters based on identification information of said terminal,
    wherein said RF is in very high frequency (VHF), ultra high frequency (UHF), or super high frequency (SHF) range.

2. The RF device of claim 1, wherein said identification information comprises an International Mobile Equipment Identification Number (IMEI).

3. The RF device of claim 1, wherein said RF parameters include an RF transmission power.

4. The RF device of claim 1, wherein said terminal comprises a cell phone, a PDA, or a computer.

5. The RF device of claim 1, wherein said RF device comprises a SIM card.

6. A terminal comprising:
    a radio frequency (RF) device comprising an RF antenna configured to exchange data with an RF reader; and
    a controller configured to control a communication range between the RF device and the RF reader by selecting RF parameters based on identification information of said terminal,
    wherein said RF is in very high frequency (VHF), ultra high frequency (UHF), or super high frequency (SHF) range.

7. The terminal of claim 6, wherein said identification information comprises an International Mobile Equipment Identification Number (IMEI).

8. The terminal of claim 6, wherein said RF parameters comprises an RF transmission power.

9. The terminal of claim 6, wherein the terminal is configured send said identification information through a short message.

10. The terminal of claim 9, wherein the terminal is configured to send the identification information to a network server.

11. The terminal of claim 10, wherein the terminal is further configured to receive RF transmission parameters from the network server.

12. The terminal of claim 11, wherein the terminal is further configured to prompt a user to calibrate the terminal if the RF transmission parameters are not received.

13. The terminal of claim 6, wherein the terminal comprises a cellular phone, and wherein the RF device comprises a SIM card and is configured to be disposed in a SIM slot of the cellular phone.

14. The terminal of claim 6, wherein the controller is configured to reduce a communication range afforded by the VHF, UHF, or SHF.

15. A system comprising:
- a mobile terminal having a radio frequency (RF) device disposed therein, the RF device comprising an RF antenna configured to exchange data with an RF reader, wherein said RF is in very high frequency (VHF), ultra high frequency (UHF), or super high frequency (SHF) range;
- an RF reader;
- a controller configured to control a communication range between the RF device and the RF reader; and
- a read-write converting device configured to provide an interface to a host computer, wherein said interface is compatible with the VHF, UHF, SHF range or a low-frequency, 13.56 MHz range.

16. The system of claim 15, wherein the mobile terminal comprises an integrated interface including a combined menu for the RF device and a conventional SIM too kit (STK) menu.

17. The system of claim 15, further comprising:
- a short-range point-of-service (POS) machine;
- a long-range POS machine; and
- an authorization server,
- wherein the short-range POS machine and the long-range POS machine operate in the same VHF, UHF, or SHF range.

18. The system of claim 15, wherein the RF reader is configured, as an access control device, to promulgate information to the mobile terminal through the RF device.

19. The system of claim 15, wherein said controller is part of the RF reader.

20. The system of claim 15, wherein said controller is part of the terminal.

21. The system of claim 15, wherein said controller is part of the RF device.

* * * * *